March 6, 1951     E. C. GREISEN     2,543,776
APPARATUS FOR COOLING GRANULAR SOLIDS
Filed May 13, 1944
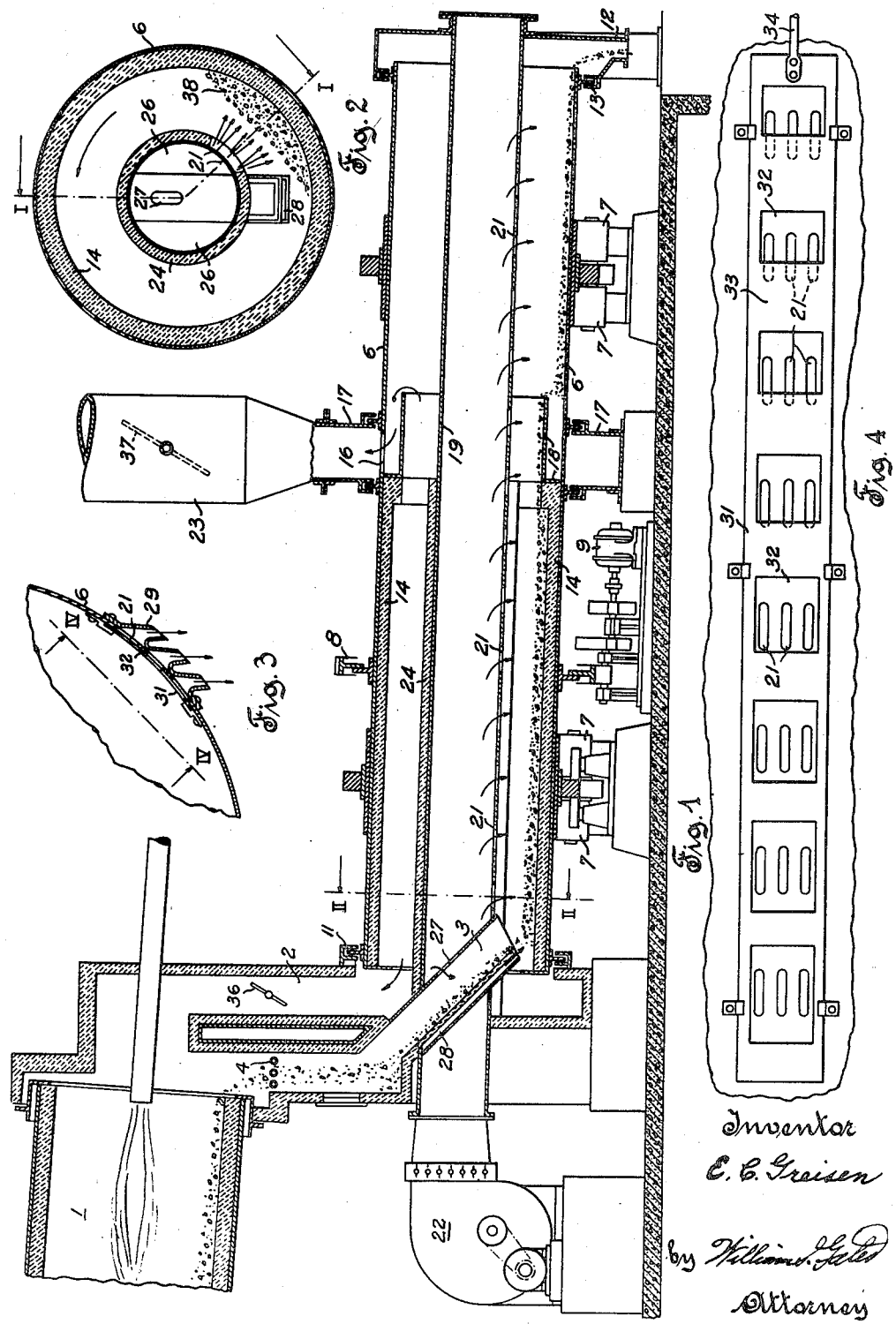
Inventor
E. C. Greisen
by William S. Gates
Attorney Patented Mar. 6, 1951

2,543,776

UNITED STATES PATENT OFFICE 2,543,776

APPARATUS FOR COOLING GRANULAR SOLIDS

Elijah C. Greisen, Wauwatosa, Wis., assignor to Allis Chalmers Manufacturing Company, Milwaukee, Wis., a corporation of Delaware Application May 13, 1944, Serial No. 535,496

3 Claims. (Cl. 34—138)

This invention relates to apparatus for cooling granular materials.

Particularly in the field of cooling cement clinker, but also in cooling other roasted or otherwise highly heated granular solids, particularly calcined minerals, it is often desirable to quench, that is cool as rapidly as possible, the material in order to make it more friable, or more readily ground, with a consequent saving in power necessary for subsequent grinding and an improvement in facility of handling.

Rotary coolers have been used for the cooling of cement clinker and other hot solids by showering the material through a stream of air in the cooler; however, rotary coolers have not been very successful where quenching action is desired, because most frequently the air with which the hottest material comes into contact is already highly heated by cooling previously contacted material, and for other reasons, particularly that the amount of air required to support combustion in an associated kiln or roaster is not ordinarily sufficient to cool the discharge down to a temperature desirable for handling on certain types of equipment. Furthermore, showering and violent agitation of the material to obtain intimate contact with cooling air is apt to cause a serious dust nuisance.

It is an object of the present invention to provide an improved method of rapidly cooling materials by gaseous media. Another object is to provide apparatus for carrying out the improved cooling method of the invention.

It is a further object of the present invention to provide improved means to effectively air quench hot materials in a rotary drum type cooler.

It is a still further object to provide means for obtaining cooling contact between cool air and material to be cooled in a rotating drum without showering or excessively agitating the material in the drum, thus avoiding dust nuisance.

It is still a further object of the invention to properly distribute cooling air in a rotary drum cooler to obtain maximum cooling effect coincident with good quenching and waste heat recovery.

More specifically the invention is concerned with providing for forcing cool air into contact with a more or less compact turbulent stream of material in a slowly revolving cooler drum and for removal of air highly heated by the material through a portion of the cooler where such heated air does not further contact the material stream being cooled by the cooler air.

The invention and the above objects and any further objects which may appear herein may be carried into practical effect as described below with reference to the drawing in which:

Fig. 1 is a longitudinal view partly in section on planes indicated by the line I—I in Fig. 2 of apparatus embodying the invention;

Fig. 2 is a cross-section to an enlarged scale of the cooler of the invention, taken on line II—II of Fig. 1;

Fig. 3 is a fragmentary cross-section on the line II—II of a portion of the cooler structure of Fig. 1 showing a preferred modification; and Fig. 4 is a fragmentary elevational view taken from the line IV—IV of Fig. 3.

The invention consists partly in a method of cooling materials, particularly granular solids.

In cooling such solids as cement clinker, it is desirable to obtain very rapid cooling or quenching action. It is also desirable to cool cement clinker and other hot mineral products in a gaseous medium, such as air. However, it is difficult to obtain the proper cooling and quenching effect in air without violently agitating the hot granular material and creating a dust which will be carried off by the air and become a nuisance.

Proper air quenching and cooling, can according to the present invention, be obtained by the method of forming the materials into a loosely compact, slowly convolving and flowing stream in which all the particles roll, move and slide slowly with a gently turbulent action and progress horizontally from one point to another, all particles being repeatedly exposed on the surface of the stream as it moves in its path of flow, and directing high velocity jets of a relatively cold gaseous cooling medium such as air on the exposed surfaces of the slowly convolving and flowing stream at several points along its path of flow. The jets of gaseous cooling fluid are directed substantially normally to the stream surface and will quench or quickly cool all particles with which the rapidly moving cooling fluid comes into contact. The stream of materials will be loose enough so that a certain penetration of the cold fluid into the mass will occur. In this manner quenching or rapid cooling effect may be obtained without the dust nuisance created by violently agitating the materials in a slow moving stream of air, or blowing air transversely through a layer of materials at high velocity as is done in other methods of cooling.

It will be understood that this method of cooling may be applied with advantage to other cooling problems such as the quick freezing of food particles, as well as the cooling of cement clinker and other hot mineral products. The air jets may, in the case of food freezing, be replaced by high velocity jets of expanding refrigerants of types suitable for direct contact freezing without causing damage to or deleterious effects on food particles, such refrigerants being well known to persons skilled in the food freezing art.

The accompanying drawing is illustrative of a specific apparatus embodying the invention and for carrying out the method described hereinabove, shown in practical operating relation with the firing and discharge end of a rotary kiln 1 or other apparatus (not shown) producing hot material to be quenched and cooled. Heated air for supporting combustion in the kiln may be supplied through a conduit 2, while the hot material is discharged to a chute 3 which may or may not be provided with a safety grate 4 to prevent abnormally large clinkers or broken brick, etc., from passing to the cooler.

The cooler drum or shell 6, the lower half of which forms an impervious trough-like material supporting surface, is mounted for rotation on bearing supports 7 and rotated by a driving gear 8 and motor 9 at a suitable speed. The drum or shell 6 may be inclined to the horizontal a suitable amount to cause conveying action upon rotation of the drum. The drum 6 preferably has a smooth imperforate inner wall without lifters or other projections which would cause high lifting effect on the materials in the drum.

Conduit 2 forms a housing for the feed or higher end of shell 6 which is rotatably sealed therewith by a labyrinth seal 11. Chute 3 passes through one wall of conduit 2 into the feed end of shell 6 extending to a point just above the lower portion of the inner peripheral wall of the said shell. The discharge end of cooler shell 6 is enclosed by a stationary discharge housing 12 with which it is rotatably connected as by a labyrinth seal 13.

At least the feed end portion of cooler shell 6 may be provided with a refractory or heat resisting lining 14 to prevent damage due to overheating of the metal shell 6.

Intermediate the feed and discharge ends, apertures 16 may be provided, and a stationary housing 17 may be erected to receive air discharged through these apertures for reasons fully disclosed hereinafter. When such apertures are provided, an annular dam and bridge 18 is built in the drum to allow material being cooled to pass apertures 16 without falling through them while providing free passage for air or other fluid to and from the interior of shell 6 through said apertures 16.

Extending through the feed end housing 2, or the discharge end housing 12 or both, a stationary air distributing duct 19 extends through at least a portion of the length of the space within shell 6. Duct 19 may be supported on housing 2, housing 12, or both, or provided with any known suitable supporting structure (not shown). A series of apertures or nozzles 21 are provided in duct 19 within shell 6 for air distribution. Connected with duct 19 in any suitable manner is a blower 22 for forcing air into duct 19. Obviously the blower 22 may, if desirable, be replaced by exhaust blowers or fans (not shown) in conduit 2 or in a conduit 23 connected to housing 17, the purpose of the blowers or fans being to cause air to flow into duct 19, from outside the shell 6 and pass through apertures 21 into the space within shell 6 for reasons to be fully disclosed hereinafter.

To protect the metal duct 19 and insulate the air therewithin from the surrounding air within shell 6, it may be coated for at least a portion of its length with heat resistant insulation 24.

Chute 3 preferably is arranged as shown to pass obliquely through duct 19 in fixed relation thereto, with spaces laterally thereof for air to pass around the chute as shown at 26 in Fig. 2. A nozzle or aperture 27 may be provided in the upper wall of chute 3 to direct a jet of air toward the bottom thereof; and cooling passages 28 opening at one end within the air space in duct 19 and passing longitudinally of the lower wall or bottom of chute 3 to the lower end thereof and opening at their other end to the space within shell 6 below duct 19 may be provided for reasons disclosed hereinafter.

In duct 19 the apertures 21 are arranged in longitudinally spaced relation along the lower quadrant in the direction of rotation as shown in Fig. 2, and may be provided with protruding nozzle fittings 29, as shown in Fig. 3, arranged to direct jets of fluid flowing through the apertures 21 in the desired direction in relation to the material in the shell 6. A longitudinally extending arcuate valve plate 31 is slidably held within duct 19 and is provided with apertures 32 and cover portions 33 so proportioned that the apertures 21 at the discharge end of duct 19 may be closed by a cover portion 33 and the remaining groups of apertures 21 in sequence toward the feed end will be successively closed or partially closed as will be clear from Fig. 4 of the drawing. An operating rod 34 may be extended through one end of duct 19 or housing 12 in an obvious manner or any other known suitable mechanism (not shown) can be employed to longitudinally slide the plate 31 with relation to duct 19 to control the flow of fluid through apertures 21.

Butterfly valves 36 and 37 may be provided in conduits 2 and 23, respectively, for controlling the distribution of air from shell 6 to the kiln and conduit 23, respectively.

The improved quenching cooler operates as follows.

Hot clinker or other hot solid granular material is continuously fed via chute 3 into the space at the feed end of shell 6 between the inner periphery of the shell or lining 14 and the lower wall of stationary air duct 19. The rotation of shell 6 is carried on at a rate such that the incoming material forms into a more or less compact stream, traveling in a lower quadrant of the shell 6 longitudinally of the shell and continually convolving in the stream in a more less gently turbulent flow due to its tendency to roll and slide down the moving inclined inner surface of the shell which tends to lift the material and propel it toward the discharge end. The rate of rotation of shell 6 on its axis is purposely kept low in order to avoid too high lifting and showering of the material, and keep the stream of material compact and confined to a space roughly indicated in Fig. 2 where the stream of material is shown in cross-section at 38. It will be clear that in such a stream all the material is tumbling and rolling and all is exposed on the stream surface at intervals and that the mass of material is kept porous or loose and in a state suitable for penetration of air into the mass.

Blower 22 is operated to force cold air into duct 19 creating a pressure differential between the interior of duct 19 and the space surrounding duct 19 within shell 6. The air rushes through apertures 21 or nozzle fittings 29 in a plurality of high velocity jets directed to impinge on the surface of the stream of material 38. The air in duct 19 is cold or very cool relative to the material discharged by chute 3 and the high velocity jets impinging on the material cause a quenching or very rapid cooling of the material with which the air comes into intimate contact, in the surface of stream 38 and by penetrating into the loose stream. The air heated by contact with the material flows through the free air space surrounding duct 19 within shell 6 and is discharged without further intimate contact with the incoming material through conduit 2 where its heat is utilized in the promotion of combustion and in heating the material in kiln 1.

Since more air is usually required to cool cement clinker and similar roasted material to a low enough temperature to make it suitable for handling and grinding or other treatment than is required to support combustion in the kiln or roaster, an outlet must be provided for excess heated air. It is to serve as such an outlet that apertures 16, housing 17 and conduit 23 are provided. Valves 36 and 37, respectively, are adjusted to obtain just sufficient air in conduit 2 to meet the requirements of combustion in the kiln or roaster 1. Heat in air from conduit 23 may be conserved by utilization for drying coal or for any other heat utilizing process.

Nozzle or aperture 27 and the apertures or nozzles 21 nearest the feed end of shell 6 are always left open to supply a full high velocity cooling stream to quench or rapidly cool the entering material. The remainder of the nozzles 21 in duct 19 toward the feed end may be controlled by valve plate 31 to supply more or less cooling air to the already quenched material to control the degree of cooling before discharge and to control the temperature of air supplied to the kiln 1 through conduit 2.

Cooling passages 28 may be provided to cool and protect the bottom of chute 3 over which pass the very hot materials fed into the cooler. The pressure differential between the interior of duct 19 and the cooler space proper will induce a flow of cooling air through passages 28 which will protect the bottom of chute 3 from damage due to excessive heating.

It will be understood that the chute 3 may be to one side of duct 19 and need not pass through it, and that duct 19 need not be cylindrical or coaxial with drum 6; and, in short, that the specific structure described and illustrated is only by way of example, the invention being intended to include such modifications and equivalents of the method and apparatus as may readily occur to persons skilled in the art within the scope of the appended claims.

It is claimed and desired to secure by Letters Patent:

1. Air quenching apparatus for hot granular materials comprising a rotatable drum, means to rotate said drum at a rate such that granular materials received therein will form a well defined tumbling stream confined substantially to a lower quadrant thereof, a startionary air duct extending into the material receiving end of said drum and throughout a substantial portion of the length in spaced relation to the inner surface of said drum, said duct having nozzles directed toward the exposed surface of said stream, a material introducing chute passing from outside said drum obliquely downward through said duct to the space below said duct and within said drum, air circulating means operatively connected to said duct and said drum to induce a current of cooling air into said duct around the said chute and through said nozzles into the interior of said drum, and means to discharge materials from said drum.

2. Air quenching apparatus for hot granular materials comprising a rotatable drum, means to rotate said drum at a rate such that granular materials received therein will form a well defined tumbling stream confined substantially to a lower quadrant thereof, a stationary air duct extending into the material receiving end of said drum and throughout a substantial portion of the length in spaced relation to the inner surface of said drum, said duct having nozzles directed toward the exposed surface of said stream, a material introducing chute passing from outside said drum obliquely downward through said duct to the space below said duct and within said drum, said chute forming a closed conduit through said duct and having in its top wall a nozzle opening from the space within said duct and directed toward the bottom of said chute, air circulating means operatively connected to said duct and said drum to induce a current of cooling air into said duct around said conduit and through said nozzles into said chute and drum, and means to discharge materials from said drum.

3. Air quenching apparatus for hot granular materials comprising a rotatable drum, means to rotate said drum at a rate such that granular materials received therein will form a well defined tumbling stream confined substantially to a lower quadrant thereof, a stationary air duct extending into the material receiving end of said drum and throughout a substantial portion of the length in spaced relation to the inner surface of said drum, said duct having nozzles directed toward the exposed surface of said stream, a material introducing chute passing from outside said drum obliquely downward through said duct to the space below said duct and within said drum, cooling fluid passages in the bottom of said chute within said duct, said passages opening at one end to the air space within said duct and terminating at the lower end of said chute in the space between said duct and the inner surface of said drum, air circulating means operatively connected with said duct and said drum to induce a current of cooling air into said duct around said chute and through said passages and nozzles into said drum, and means for discharging materials from said drum.

ELIJAH C. GREISEN.

REFERENCES CITED

The following references are of record in the file of this patent:

UNITED STATES PATENTS

| Number | Name | Date |
| --- | --- | --- |
| 317,461 | Justus | May 5, 1885 |
| 1,085,939 | Prindle | Feb. 3, 1914 |
| 1,293,780 | Hornsey | Feb. 11, 1919 |
| 1,332,380 | Christie | Mar. 2, 1920 |
| 1,896,020 | Shimadzu | Jan. 31, 1933 |
| 1,902,517 | Newhouse | Mar. 21, 1933 |
| 2,024,934 | Lellep | Dec. 17, 1935 |
| 2,130,731 | Carter | Sept. 20, 1938 |

FOREIGN PATENTS

| Number | Country | Date |
| --- | --- | --- |
| 3,178 | Great Britain | Dec. 18, 1861 |
| 8,405 | Great Britain | June 25, 1886 |
| 342,205 | Germany | Oct. 15, 1921 |
| 404,632 | Great Britain | Jan. 9, 1934 |
| 508,388 | Germany | Sept. 27, 1930 |